United States Patent
Ito et al.

(10) Patent No.: US 6,829,949 B2
(45) Date of Patent: Dec. 14, 2004

(54) SEATING DETECTING DEVICE

(75) Inventors: Koji Ito, Aichi-ken (JP); Kazuya Tanaka, Nagoya (JP); Takeshi Tahara, Kariya (JP); Wataru Otake, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 108 days.

(21) Appl. No.: 10/201,081

(22) Filed: Jul. 24, 2002

(65) Prior Publication Data

US 2003/0020593 A1 Jan. 30, 2003

(30) Foreign Application Priority Data

Jul. 26, 2001 (JP) .................................. 2001-226608

(51) Int. Cl.[7] .............................................. G01D 7/00
(52) U.S. Cl. .................................................. 73/862.041
(58) Field of Search ................. 73/862.041, 862.391, 73/862.474, 862.046, 862.043, 795, 767; 701/45; 338/114; 280/735; 702/173; 177/144, 25.13; 340/665–667; 307/10.1; 156/583.2; 297/180, 180.11, 284.1; 5/606; 434/59

(56) References Cited

U.S. PATENT DOCUMENTS

| | | | | |
|---|---|---|---|---|
| 4,059,909 A | * | 11/1977 | Kron ............................ 435/59 |
| 4,997,230 A | * | 3/1991 | Spitalnick ............... 297/180.11 |
| 5,176,424 A | * | 1/1993 | Tobita et al. ............. 297/284.1 |
| 5,640,728 A | * | 6/1997 | Graebe ........................... 5/606 |
| 5,918,696 A | * | 7/1999 | VanVoorhies ............... 180/273 |
| 6,345,839 B1 | * | 2/2002 | Kuboki et al. ............... 280/735 |
| 6,367,837 B1 | * | 4/2002 | Hamada et al. ............. 280/735 |
| 6,569,283 B1 | * | 5/2003 | Sperry et al. ............. 156/583.2 |

FOREIGN PATENT DOCUMENTS

JP         10-211836 A         8/1998

* cited by examiner

*Primary Examiner*—Edward Lefkowitz
*Assistant Examiner*—Octavia Davis
(74) *Attorney, Agent, or Firm*—Burns, Doane, Swecker & Mathis, LLP

(57) ABSTRACT

A seating detecting device is comprised of a first cushion having an insert wire embedded therein, a second cushion placed on the first cushion, a surface sheet placed on the second cushion, a suspension wire fixed to the surface sheet and arranged between the surface sheet and the second cushion, and a pressure detecting device provided between an upper surface of the first cushion and a lower surface of the second cushion and having a plurality of through-holes for the suspension wire being fixed by the insert wire therethrough thereby to fix the surface sheet to the first and second cushions.

15 Claims, 5 Drawing Sheets

SEATING DETECTING DEVICE

CROSS REFERENCE OF RELATED APPLICATION

This application is based on and claims priority under 35 U.S.C. §119 with respect to Japanese Application No. 2001-226608 filed on Jul. 26, 2001, the entire content of which is incorporated herein by reference.

FIELD OF THE INVENTION

This invention relates to a seating detecting device. More particularly, the present invention pertains to a seating detecting device which detects a physique of a passenger and a shape of an object.

BACKGROUND OF THE INVENTION

Figure 5:
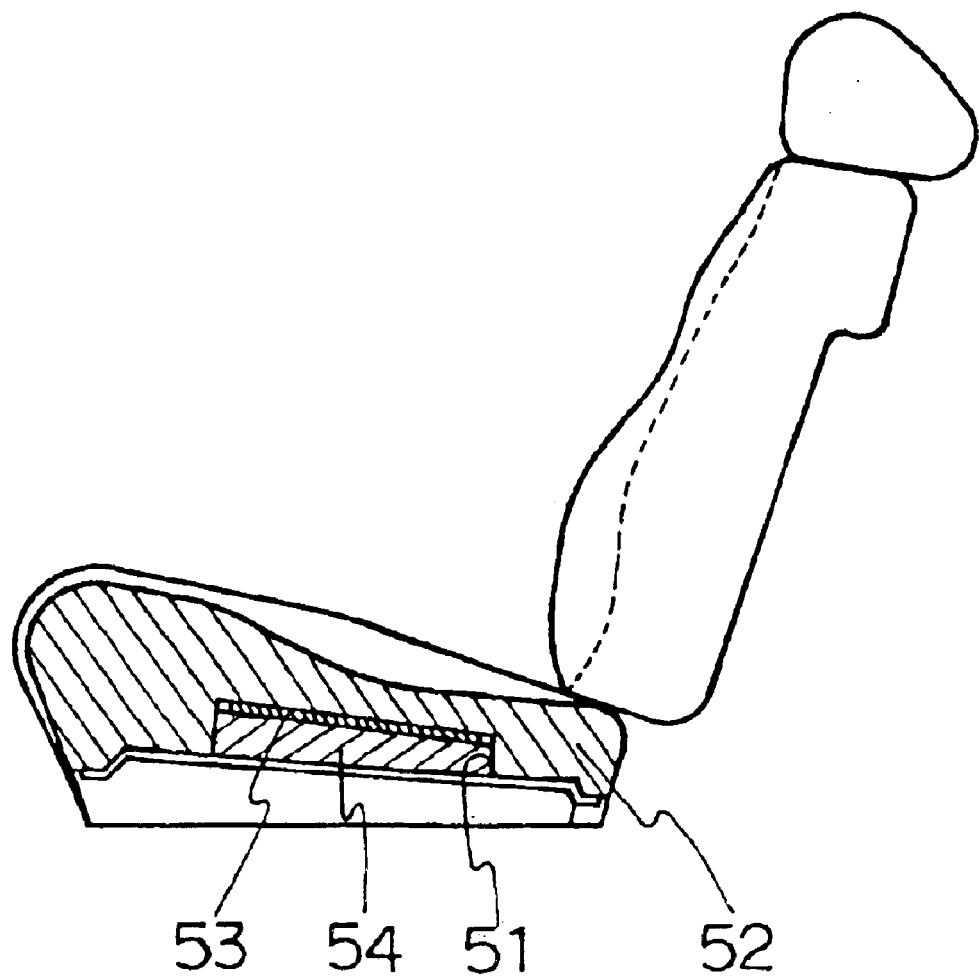

A known device is disclosed in Japanese Patent Laid-Open Publication No.10-211836. As shown in FIG. 5, the known device includes a cushion 52, a pressure sensitive switch 53 which is a flexible sheet contained under a recess 51, and a resilient closure 54 which is in contact with a lower surface of the pressure sensitive switch 53, closing the recess 51. The recess 51 is opening toward a bottom which is located in the opposite side of a seating surface in the cushion 52.

Because the known device is only aimed to detect whether a passenger is seated or not, the pressure sensitive switch 53 does not need a large area in a seating area.

However, in order to operate an air bag appropriately as a passenger protection device, an identification of an object on the seat has been needed. More specifically, a judgment of whether an item on the seat is a passenger or an object, and furthermore, if it is a passenger, an identification of a physique of the passenger is needed. In order to obtain such specific information about what is on the seat, a pressure detecting sensor which has a detection area in almost an entire seating area of a cushion is necessary. Also, the pressure detecting device needs to be disposed in a position which is close to a seating surface to assure a detection accuracy.

In addition, normally a seat for a vehicle is structured to fix a surface sheet in the cushion by fixing a suspension wire of the surface sheet with a wire which is embedded in the cushion with a fixing ring. Therefore, if a pressure detecting sensor is disposed in a position which is close to the seating surface, the pressure detecting sensor interferes with the suspension wire of the surface sheet. As a result, a shape of the pressure detecting sensor needs to be formed to avoid an interference with the suspension wire. However, because the suspension wire has various layout patterns in accordance with designs of seats, various forms of the pressure detecting sensor are needed in accordance with the layout patterns of the suspension wire.

Accordingly, it is an object of the present invention to provide a seating detecting device which has an area covering the entire seating surface to be applicable to various design seats.

SUMMARY OF THE INVENTION

According to the first aspect of the invention, a seating detecting device is comprised of a first cushion having an insert wire embedded therein, a second cushion placed on the first cushion, a surface sheet placed on the second cushion, a suspension wire fixed to the surface sheet and arranged between the surface sheet and the second cushion, and a pressure detecting device provided between an upper surface of the first cushion and a lower surface of the second cushion and having a plurality of through-holes for the suspension wire being fixed by the insert wire therethrough thereby to fix the surface sheet to the first and second cushions.

According to the second aspect of the invention, the seating detecting device is further comprised of a fixing member fixing the insert wire and the suspension wire.

According to the third and forth aspect of the invention, the seating detecting device is characterized in that the plurality of through-holes is arranged along a first direction and a second direction, and the first direction crosses the second direction.

According to the fifth and sixth aspects of the invention, the pressure detecting device includes a plurality of pressure detecting elements.

According to the seventh and eighth aspect of the invention, the second cushion includes a plurality of through-holes corresponding to the plurality of through-holes of the pressure detecting device.

BRIEF DESCRIPTION OF THE INVENTION

Figure 1:
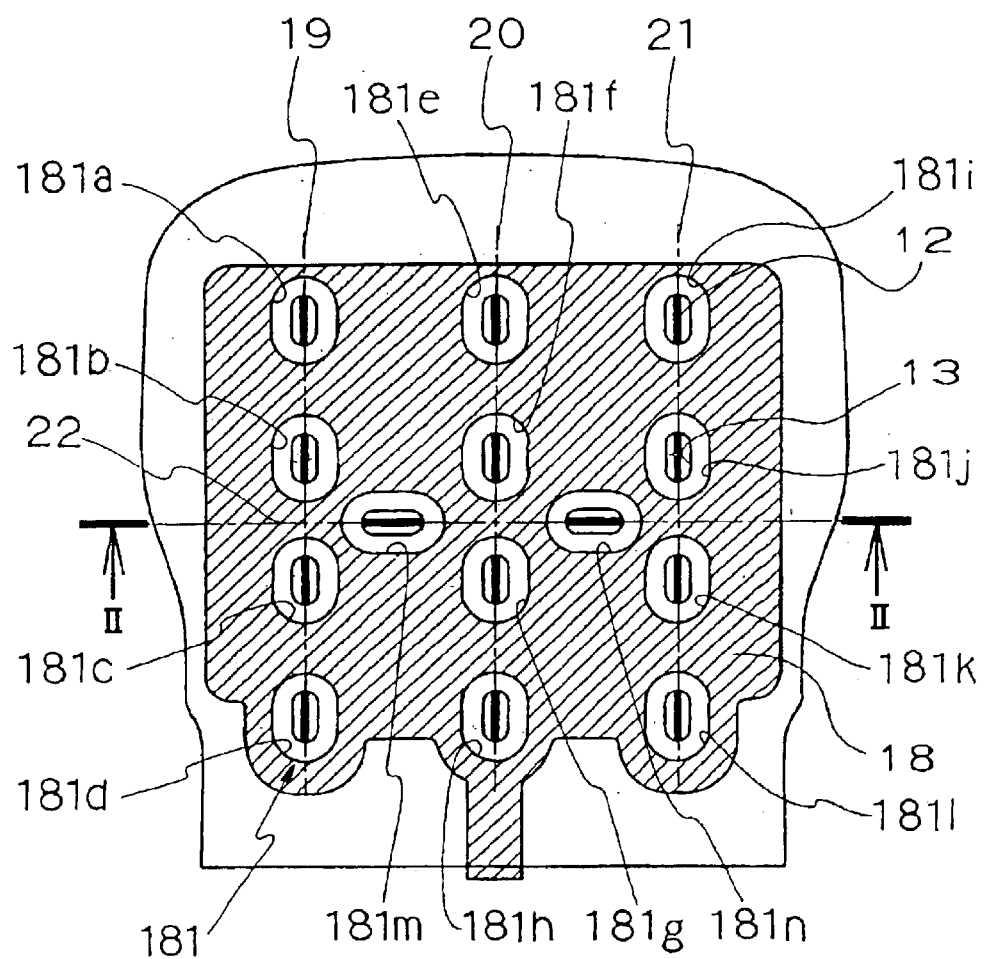
Figure 2:
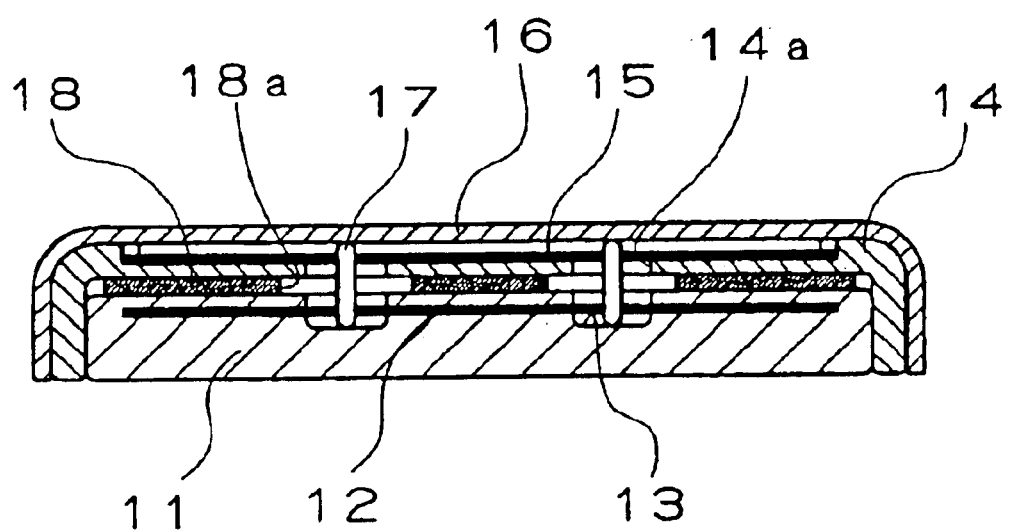
Figure 3:
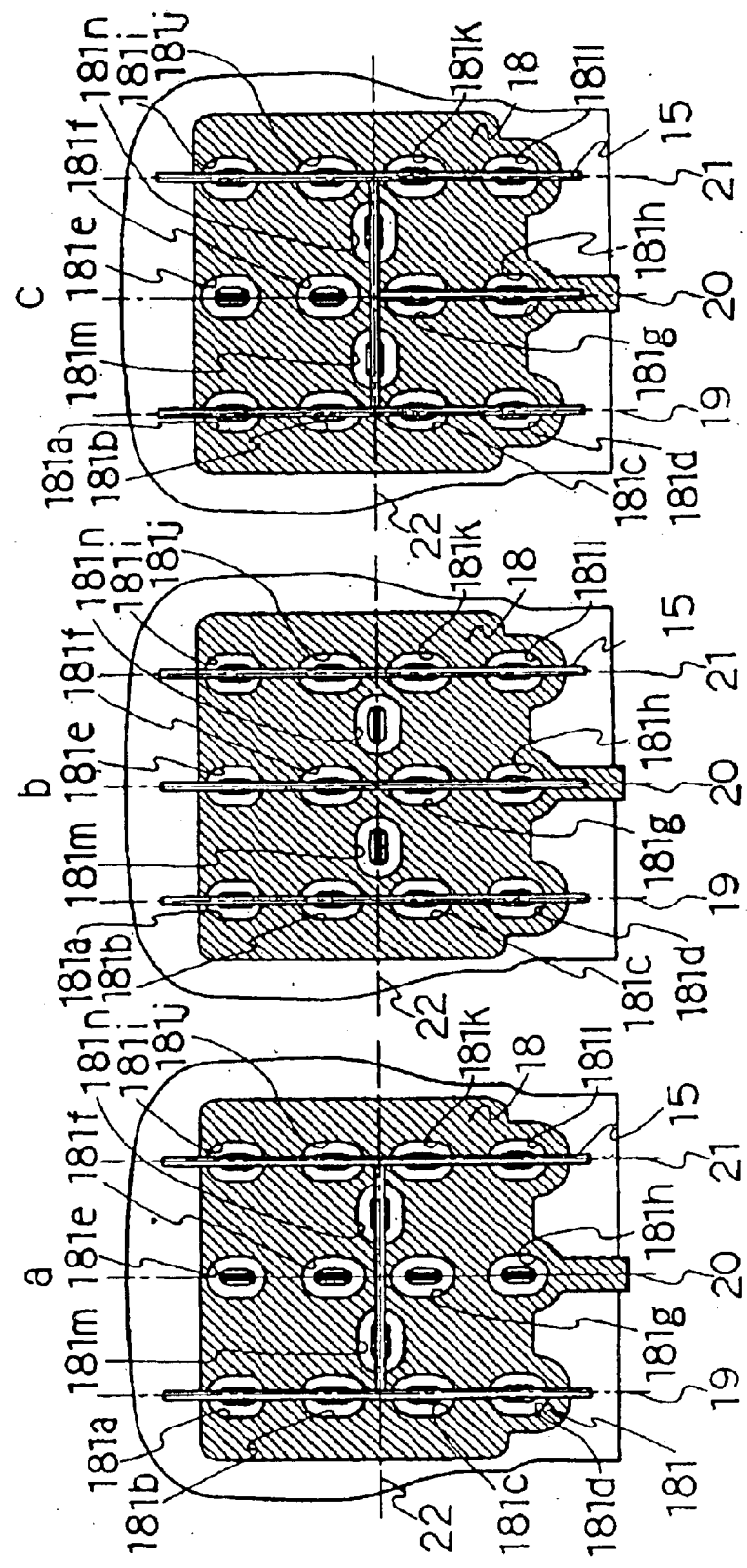
Figure 4:
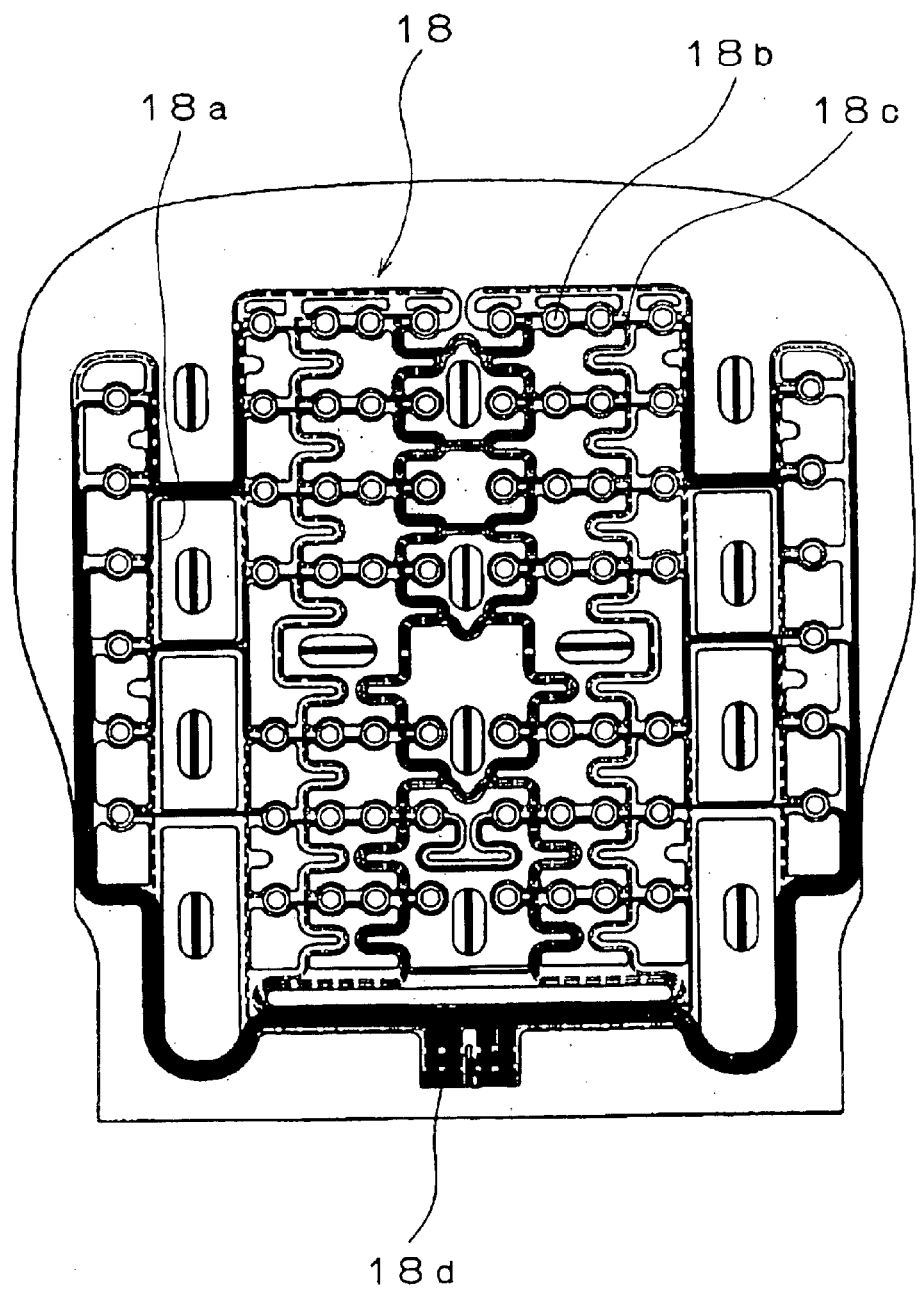

The foregoing and additional features and characteristics of the present invention will become more apparent from the following detained description considered with reference to the accompanying drawing figures in which like reference numerals designate like elements:

FIG. 1 is a plane view showing a portion of a sensor film 18 omitting a surface sheet 16 and an upper cushion 14 according to an embodiment of the invention;

FIG. 2 is a cross- sectional view taken along the line II—II shown in FIG. 1 of the seating detecting device 10 including the surface sheet and the upper cushion 14;

FIG. 3 is a plane view three patterns of a lower cushion 11 and a sensor film 18 of the seating detecting device 10 which are applied to three layout patterns of the suspension wire 15 according to the embodiment of the invention;

FIG. 4 is a plan view of the sensor film 18 of the seating detecting device 10 according to the embodiment of the invention; and FIG. 5 is a cross sectional view of a seating detecting device 50 of a known art.

DETAILED DESCRIPTION OF THE INVENTION

Embodiments of this invention will be explained with reference to the attached drawings.

As shown in FIG. 1 and FIG. 2, a seating detecting device 10 includes a lower cushion 11 (ie., a first cushion) and an upper cushion 14 (ie., a second cushion). An exposed portion 13 is disposed in an upper surface of the lower cushion 11. A part of an insert wire 12 is exposed in the exposed portion 13 In the upper cushion 14, a plurality of through-holes 14a is disposed for inserting a suspension wire 15. The plurality of through-holes 14a is overlapping with the upper surface of the lower cushion 11.

From above the upper cushion 14 and the lower cushion 11, a surface sheet 16 covers the upper cushion 14 and the lower cushion 11. The suspension wire 15 is fixed to the surface sheet 16 and almost arranged between the surface sheet 16 and the upper cushion 14. A flexible sensor film 18 (ie., a pressure detecting device) with fourteen through-holes 181 (ie., through-holes) which are arranged for fixing the suspension wire 15 is laid down between the upper surface of the lower cushion 11 and a lower surface of the upper cushion 14.

As shown in FIG. 1, the through-holes 181 are arranged along hole lines 19 through 22. The hole lines 19, 20, and 21 are linearly located in parallel with one another in longitudinal direction relative to the sensor film 18 (ie., a top and bottom direction as viewed in FIG. 1), The hole line 20 is linearly located at the central portion of the sensor film 18. The hole line 22 is located at the central portion of the sensor film 18, and it is linearly arranged in the width direction relative to the sensor film 18. Four through-holes 181a, 181b, 181c, and 181d are arranged on the hole line 19 from an upper end to a lower end as viewed in FIG. 1 in longitudinal direction relative to the sensor film 18 with equal intervals. On the hole line 20, four through-holes 181e, 181f, 181g, and 181h are arranged from an upper end to a lower end in longitudinal direction relative to the sensor film 18 with equal intervals. On the hole line 21, four through-holes 181i, 181j, 181k, and 181l are arranged from an upper end to a lower end in longitudinal direction relative to the sensor film 18 with equal intervals. In the hole line 22, a through-hole 181m is located between the hole line 19 and the hole line 20, and a through hole 181n is located between the hole line 20 and the hole line 21 respectively.

In order to fix the surface sheet 16 in the lower cushion 11 and the upper cushion 14, a fixing ring 17 (ie., a fixing member) is used to fix the insert wire 12 and the suspension wire 15 in the exposed portion 13 of the insert wire 12, winding the insert wire 12 and the suspension wire 15 together. When fixing the insert wire 12 and the suspension wire 15, the suspension wire 15 is fixed in the through-holes 14a and the through-holes 181. Furthermore, when the insert wire 12 and the suspension wire are fixed through the through-holes 14a and the through-holes 181, the suspension wire 15 of the surface sheet 16 is pulled in a seat. As a result, the surface sheet 16 is fixed to the upper cushion 14 and the lower cushion 11 and a design of a seat is determined when the insert wire 12 and the suspension wire 15 are fixed.

The surface sheet 16 is fixed in the upper cushion 14 and the lower cushion 11 by the fixing ring 17. At the same time, the sensor film 18 is laid down and fixed between the lower surface of the upper cushion 14 and the upper surface of the lower cushion 11 by the insert wire 12 of the lower cushion 11.

The upper surface of the lower cushion 11 is nearly flat, and as shown in FIG. 1, fourteen exposed portions 13 of the insert wire 12 are disposed, overlapping with the fourteen through-holes 181 of the sensor film 18.

FIG. 4 is a plan view of the sensor film 18 with more details. The sensor film 18 is the FPC (ie., the flexible print circuit, in other words a print board which is inserted into a seat which is made of resin) in which a wiring portion 18c is connecting a plurality of a pressure sensor 18b is placed. A concentration portion 18d of the wiring portion 18c is connected to a control circuit of a vehicle directly or through a connector.

An operation of the seating detecting device 10 will be described with reference to the attached drawings.

When a passenger or a child seat is on a seating surface of a seat, the surface sheet 16, the upper cushion 14, and the lower cushion 11 are deformed because of a pressure from the object on the seating surface.

As shown in FIG. 4, the sensor film 18 is of a grid shape. Therefore, the sensor film 18 is deformed flexibly in accordance with a deformation of the seat.

As the surface sheet 16, the upper cushion 14, and the lower cushion 11 are deformed, the sensor film 18 is also deformed, and each of the pressure detecting sensors 18b receives the pressure respectively.

Electric current is always applied in the pressure detecting sensors 18b, and when the pressure is applied on the pressure detecting sensor 18, a resistance value of each pressure sensor 18b changes accordingly.

When the pressure on the seat exceeds the determined threshold value, the pressure sensor 18b functions to indicate the analog change of the resistance value.

As shown in FIG. 4, because each of the pressure sensors 18b is placed in lines, a gap in a amount of the pressure they receive among the adjacent pressure sensors 18b occurs.

For instance, when a passenger sits on the seat, there is a gap in the amount of the pressure between a part in which a buttock is on and a part in which the buttock is not on. Also, even within the part in which the buttock is on, the gaps among each pressure sensor 18b occur. Furthermore, when an object in which the pressure is put on small areas such as a foot portion of a child seat, the gaps among each pressure sensor 18b would be widened.

Because of the differences in the amount of pressure, the gap among the resistance values of each pressure sensor 18b occurs. The control circuit detects such gaps in the resistance values and a distribution of the pressure. As a result of the detections, the control circuit calculates and identifies a size, a shape, and a weight of the object on the seat surface of the seat.

Normally, a design of a seating portion of a seat is different in accordance with a type of a vehicle. The design of the seating portion is determined primarily by a layout of a suspension wire.

According to an embodiment of the invention, three of the layout patterns of the suspension wire 15 are shown in FIG. 3. As above mentioned, the sensor film 18 and the lower cushion 11 of the embodiment of the invention is structured that the fourteen through-holes 181 and the exposed portions 13 of the insert wire 12 are arranged in the longitudinal direction and the lateral direction relative to the sensor film 18. As for examples shown in FIG. 3a through FIG. 3c, these layout patterns of the suspension wires 15 overlap vertically with the sensor film 18.

As for FIG. 3a, one suspension wire 15 is located in one end of the width direction relative to the sensor film 18 (ie., the lateral direction as viewed in FIG. 3), and another wire 15 is located in the other end of the width direction relative to the sensor film 18, and these two suspension wires 15 are linearly arranged in parallel with one another in longitudinal direction relative to the sensor film 18. Furthermore, one suspension wire 15 is located at the central portion of the sensor film 18, and it is linearly arranged in the width direction relative to the sensor film 18. The suspension wires 15 of FIG. 3a overlap with the hole lines 19, 21, and 22 and the vertical direction of the sensor film 18. In this pattern, among fourteen through-holes 181, the suspension wires 15 can be inserted into four of the through-holes 181a, 181b, 181c, and 181d on the hole line 19, four of the through-holes 181i, 181j, 181k, and 181l on the hole line 21, and two of the through-holes 181m and 181n on the hole line 22 selectively.

As for FIG. 3b, two suspension wires 15 are located in both ends of the width direction relative to the pressure detecting sensor 18. In addition, one suspension wire 15 is located at the central portion of the width direction relative to the sensor film 18. These three suspension wires 15 are linearly arranged in parallel with one another in longitudinal direction relative to the sensor film 18. The suspension wires 15 of FIG. 3b overlap with the hole lines 19, 20, and 21 and the vertical direction of the sensor film 18. In this pattern, among fourteen through-holes 181, the suspension wires 15 can be inserted into four of the through-holes 181a, 181b, 181c, and 181d on the hole line 19, four of the through-holes 181e, 181f, 181g, and 181h on the hole line 20, and four of the through-holes 181i, 181j, 181k, and 181l on the hole line 21 selectively.

As for FIG. 3c, two the suspension wires 15 are located in both ends of the width direction relative to the sensor film 18 respectively, and they are linearly arranged in parallel with one another in longitudinal direction relative to the film sensor 18. Furthermore, one suspension wire 15 is located at the central portion of the sensor film 18, and it is arranged linearly from the center of the sensor film 18 to the lower end in the longitudinal direction relative to the sensor film 18. In addition, one suspension wire 15 is located at the central portion of the width direction relative to the sensor film 18. This suspension wire 15 is arranged linearly in the width direction relative to the sensor film 18. The suspension wires 15 of FIG. 3c overlap with the hole lines 19, 20, 21, and 22 and the vertical direction of the sensor film 18. In this pattern, among fourteen through-holes 181, the suspension wires 15 can be inserted into four of the through-holes 181a, 181b, 181c, and 181d on the hole line 19, two of the through-holes 181g and 181h on the hole line 20, four of the through-holes 181i, 181j, 181k, and 181l on the hole line 21, and two of the through-holes 181m and 181n on the hole line 22 selectively.

By the above structure, one layout pattern of the sensor film 18 and the lower cushion 11 shown in FIG. 1 can be applied to the surface sheet 16 which has at least three layout patterns of the suspension wire 15. In other words, it is understood that the above sensor film 18 can be applied to a seat which is comprised of at least three types of designs of the surface sheet 16.

In addition, other than placing the through-holes 181 in the longitudinal and lateral directions, the lower cushion 11 and the sensor film 18 can be applied to more various designs of seats by arranging the layout patterns of the exposed portion 13 of the insert wire 12 and the through-hole 181 in an oblique direction, or by changing the distance among each through-holes 181 and the exposed portion 13 of the insert wire 12.

In the embodiment of the present invention, a plurality of analog electric signals is used as pressure detecting elements in the sensor film 18 which is used as a pressure detecting device. However, instead of analog signals, a plurality of pressure switches which outputs on/off signals can be applied.

A seating detecting device of this invention has an area which can cover the entire area of a seating surface of a seat, and is applicable to various designs of seats. Therefore, while the device can reduce the manufacturing cost, it can achieve in detecting an object on a seat such as a child seat with high precision.

The pressure detecting device according to the invention is not interfered with the suspension wire because the suspension wire of the seating detecting device is fixed through the through-holes of the pressure detecting device. Therefore, a restriction of a size of the seating detecting device to avoid the interference with the suspension wire is not necessary. Consequently, an area for the seating detecting device can be extended to the entire upper surface of the first cushion, in other words, to a whole area of the seating surface of the seat. Furthermore, with the above structure, by using the plurality of the through-holes selectively, different layout patterns of the suspension wire can be used. Therefore, the seating detecting device can be installed in plural forms of surface sheets in which the suspension wire of different layout patterns are arranged. The forms of surface sheets determine designs of seats. Thus, the pressure detecting device can be arranged in various designs of seats.

The plurality of through-holes are placed in flat in the above structure. By fixing the suspension wire in the predetermined through-holes of the pressure detecting device selectively, the layout patterns of the suspension wires on the surface of the seat can be various. Therefore, the pressure detecting sensor can be placed in more various designs of seats.

Furthermore, according to the seating detecting device of the present invention, the seating detecting device can obtain a plurality of output results from the plurality of seating detecting elements.

What is claimed is:

1. A seating detecting device comprising:
   a first cushion having an insert wire embedded therein;
   a second cushion placed on the first cushion;
   a surface sheet placed on the second cushion;
   a suspension wire fixed to the surface sheet and arranged between the surface sheet and the second cushion;
   a pressure detecting device provided between an upper surface of the first cushion and a lower surface of the second cushion and having a plurality of through-holes; and
   a fixing member which fixes the suspension wire and the insert wire at a position defined by at least one of the through-holes to fix the surface sheet to the first and second cushions.

2. A seating detecting device according to claim 1, wherein at least some of the through-holes in the pressure detecting device are arranged in rows which are parallel to one another.

3. A seating detecting device according to claim 1, wherein the plurality of through-holes is arranged along a first direction and a second direction, and the first direction crosses the second direction.

4. A seating detecting device according to claim 2, wherein the plurality of through-holes is arranged along a first direction and a second direction, and the first direction crosses the second direction.

5. A seating detecting device according to claim 1, wherein the pressure detecting device includes a plurality of pressure detecting elements.

6. A seating detecting device according to claim 2, wherein the pressure detecting device includes a plurality of pressure detecting elements.

7. A seating detecting device according to claim 1, wherein the second cushion includes a plurality of through-holes corresponding to the plurality of through-holes of the pressure detecting device.

8. A seating detecting device according to claim 2, wherein the second cushion includes a plurality of through-holes corresponding to the plurality of through-holes of the pressure detecting device.

9. A seating detecting device comprising:
   a first cushion provided with an insert wire;
   a surface sheet;
   a second cushion positioned between the first cushion and the surface sheet;

a suspension wire fixed to the surface sheet and positioned between the surface sheet and the second cushion;

a pressure detecting device provided between the first cushion and the second cushion, the pressure detecting device being provided with a plurality of through-holes; and the suspension wire and the insert wire being fixed to each other through the through-holes in the pressure detecting device to fix the surface sheet relative to the first and second cushions.

10. A seating detecting device according to claim 9, wherein the insert wire is embedded in the first cushion.

11. A seating detecting device according to claim 9, wherein the pressure detecting device is positioned between an upper surface of the first cushion and a lower surface of the second cushion.

12. A seating detecting device according to claim 9, wherein the through-holes are arranged along a first direction and a second direction, with the first direction crossing the second direction.

13. A seating detecting device according to claim 9, wherein the pressure detecting device includes a plurality of pressure detecting elements.

14. A seating detecting device according to claim 9, wherein at least some of the through-holes in the pressure detecting device are arranged in rows which are parallel to one another.

15. A seating detecting device according to claim 9, including fixing members which fix the suspension wire to the insert wire.

* * * * *